US 12,144,047 B2

(12) United States Patent
Sedlacek et al.

(10) Patent No.: US 12,144,047 B2
(45) Date of Patent: Nov. 12, 2024

(54) METHODS FOR AVOIDING TRANSMISSION OF UNNECESSARY MESSAGES IN WIRELESS COMMUNICATIONS AND RELATED NETWORKS AND NETWORK NODES

(71) Applicant: Telefonaktiebolaget LM Ericsson (publ), Stockholm (SE)

(72) Inventors: Ivo Sedlacek, Hovorcovice (CZ); Peter Hedman, Helsingborg (SE); Kaj Johansson, Gothenburg (SE); Nianshan Shi, Järfälla (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 496 days.

(21) Appl. No.: 17/430,778

(22) PCT Filed: Feb. 11, 2020

(86) PCT No.: PCT/EP2020/053506
§ 371 (c)(1),
(2) Date: Aug. 13, 2021

(87) PCT Pub. No.: WO2020/165192
PCT Pub. Date: Aug. 20, 2020

(65) Prior Publication Data
US 2022/0167450 A1    May 26, 2022

Related U.S. Application Data

(60) Provisional application No. 62/806,873, filed on Feb. 17, 2019.

(51) Int. Cl.
*H04W 76/18* (2018.01)
*H04W 76/30* (2018.01)
*H04W 88/14* (2009.01)

(52) U.S. Cl.
CPC ........... *H04W 76/18* (2018.02); *H04W 76/30* (2018.02); *H04W 88/14* (2013.01)

(58) Field of Classification Search
CPC ...... H04W 76/18; H04W 76/30; H04W 88/14
See application file for complete search history.

(56) References Cited

U.S. PATENT DOCUMENTS

2008/0285543 A1* 11/2008 Qiu ..................... H04L 65/1095
370/395.2
2013/0322312 A1* 12/2013 Kim ..................... H04L 65/1093
370/310

(Continued)

FOREIGN PATENT DOCUMENTS

CN         108400997 A      8/2018
WO      2003013165 A1      2/2003

(Continued)

OTHER PUBLICATIONS

International Search Report and Written Opinion of the International Searching Authority for PCT International Application No. PCT/EP2020/053506 dated May 25, 2020.

(Continued)

*Primary Examiner* — Ajay Cattungal
(74) *Attorney, Agent, or Firm* — Sage Patent Group (57) ABSTRACT

A method of operating a session management network of a telecommunications network is disclosed. The method includes sending to a management network node an accept of a session establishment request of a wireless device; and receiving a message from the management network node, including a session connectivity rejection message sent by a radio access network node serving the wireless device. The session connectivity rejection message indicates a rejection of the acceptance of the session establishment request of the wireless device The method further includes determining that the radio access network did not send the accept of the (Continued)

session establishment request to the wireless device based on the session connectivity rejection message creating a session establishment rejection message; and transmitting the session establishment rejection message toward the wireless device.

22 Claims, 6 Drawing Sheets

(56) References Cited

U.S. PATENT DOCUMENTS

| | | | |
|---|---|---|---|
| 2015/0181639 A1* | 6/2015 | Liu | H04W 76/18 |
| | | | 370/329 |
| 2018/0279400 A1 | 9/2018 | Faccin et al. | |
| 2018/0352483 A1* | 12/2018 | Youn | H04W 36/00 |
| 2018/0376444 A1 | 12/2018 | Kim et al. | |
| 2019/0261159 A1* | 8/2019 | Wang | H04W 76/18 |
| 2020/0389830 A1* | 12/2020 | Park | H04W 60/04 |
| 2021/0029628 A1* | 1/2021 | Kim | H04W 48/18 |
| 2022/0167450 A1* | 5/2022 | Sedlacek | H04W 76/18 |

FOREIGN PATENT DOCUMENTS

| | | |
|---|---|---|
| WO | 2018013021 A1 | 1/2018 |
| WO | 2018065060 A1 | 4/2018 |

OTHER PUBLICATIONS

Ericsson, "Support of piggybacking of NAS SM message while configuring a DRB," S2-1901089, Change Request, 3GPP TSG-SA WG2 Meeting #130 Jan. 21-25, 2019, Kochi, India, 12 pages.

3GPP TS 23.502 V15.4.0, "3rd Generation Partnership Project; Technical Specification Group Services and System Aspects; Procedures for the 5G System; Stage 2 (Release 15), " Technical Specification, Dec. 2018, 346 pages.

3GPP TS 24.501 V15.2.1,"3rd Generation Partnership Project; Technical Specification Group Core Network and Terminals; Non-Access-Stratum (NAS) protocol for 5G System (5GS); Stage 3 (Release 15)," Technical Specification, Jan. 2019, 455 pages.

3GPP TS 38.413 V15.2.0, "3rd Generation Partnership Project; Technical Specification Group Radio Access Network; NG-RAN; NG Application Protocol (NGAP) (Release 15)," Technical Specification, Dec. 2018, 308 pages.

Office Action for Chinese Patent Application No. 202080014627.6 dated Nov. 13, 2023, 8 pages.

Huawei et al., "Clarification of the PDU Session establishment and release procedure," S2-1900747, 3GPP TSG-SA WG2 Meeting #130, Jan. 21-25, 2019, Kochi, India, 21 pages.

Huawei et al., "Clarification of the PDU Session establishment and release procedure," S2-1900863, 3GPP TSG-SA WG2 Meeting #130, Jan. 21-25, 2019, Kochi, India, 21 pages.

\* cited by examiner

# METHODS FOR AVOIDING TRANSMISSION OF UNNECESSARY MESSAGES IN WIRELESS COMMUNICATIONS AND RELATED NETWORKS AND NETWORK NODES

CROSS REFERENCE TO RELATED APPLICATIONS

This application is a 35 U.S.C. § 371 national stage application of PCT International Application No. PCT/EP2020/053506 filed on Feb. 11, 2020, which claims the benefit of U.S. Provisional Patent Application Ser. No. 62/806,873, filed on Feb. 17, 2019, the disclosures and content of which are incorporated by reference herein in their entireties.

The present disclosure relates to wireless communications systems and, more particularly, to avoiding transmission of unnecessary messages in wireless communications.

BACKGROUND

3GPP Technical Specification (TS) 23.501-V15.0.0, clause 4.2 describes representative architectures for the 5G system. The 5G architecture is typically defined as service-based and the interaction between network functions is represented in two ways, namely, a service-based representation and a reference point representation. In the service-based representation, network functions (e.g., an Access and Mobility Management Function (AMF)) within the Control Plane enable other authorized network functions to access their services. This representation also includes point-to-point reference points where necessary. The reference point representation shows the interaction existing between the network function services in the network functions described by a point-to-point reference point (e.g., N11) between any two network functions (e.g., AMF and Session Management Function (SMF)).

Service-based interfaces are listed in TS 23.501-V15.0.0, clause 4.2.6. Reference points are listed in TS 23.501-V15.0.0, clause 4.2.7.

Figure 1A:
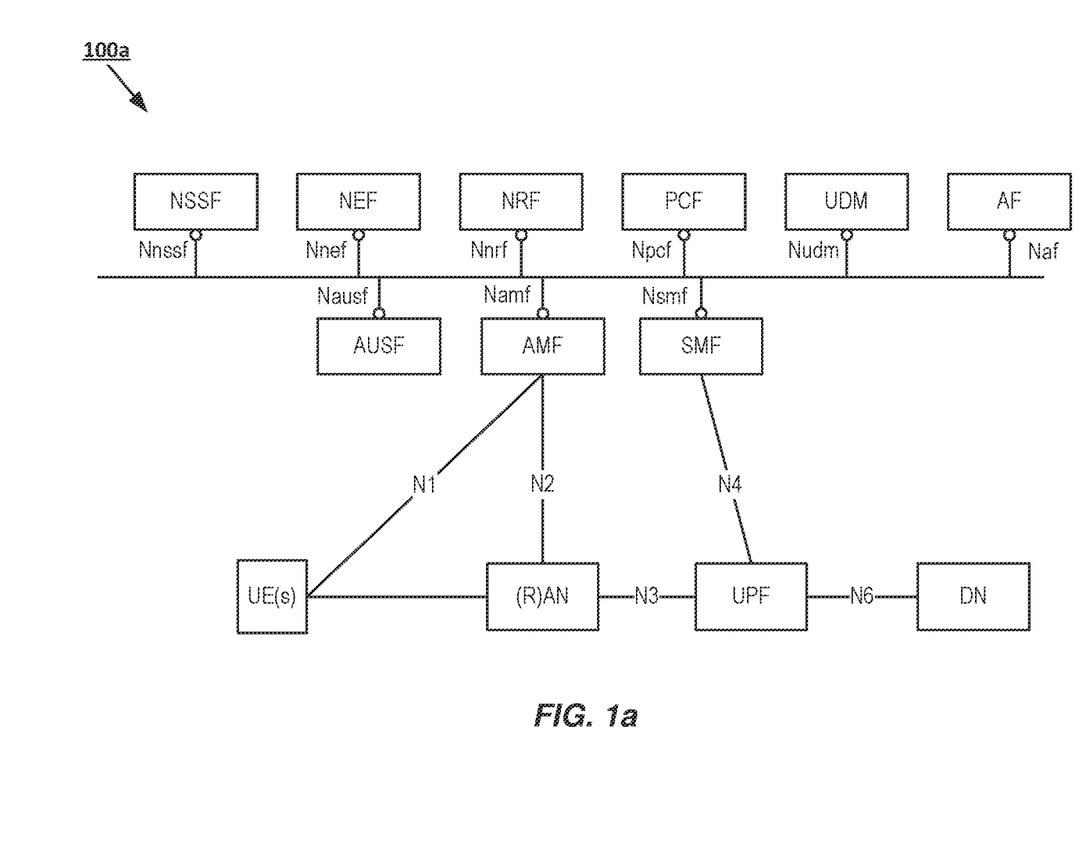
FIG. 1a depicts a non-roaming reference 5G system architecture, in which some embodiments of the present solution may be implemented.
Figure 1B:
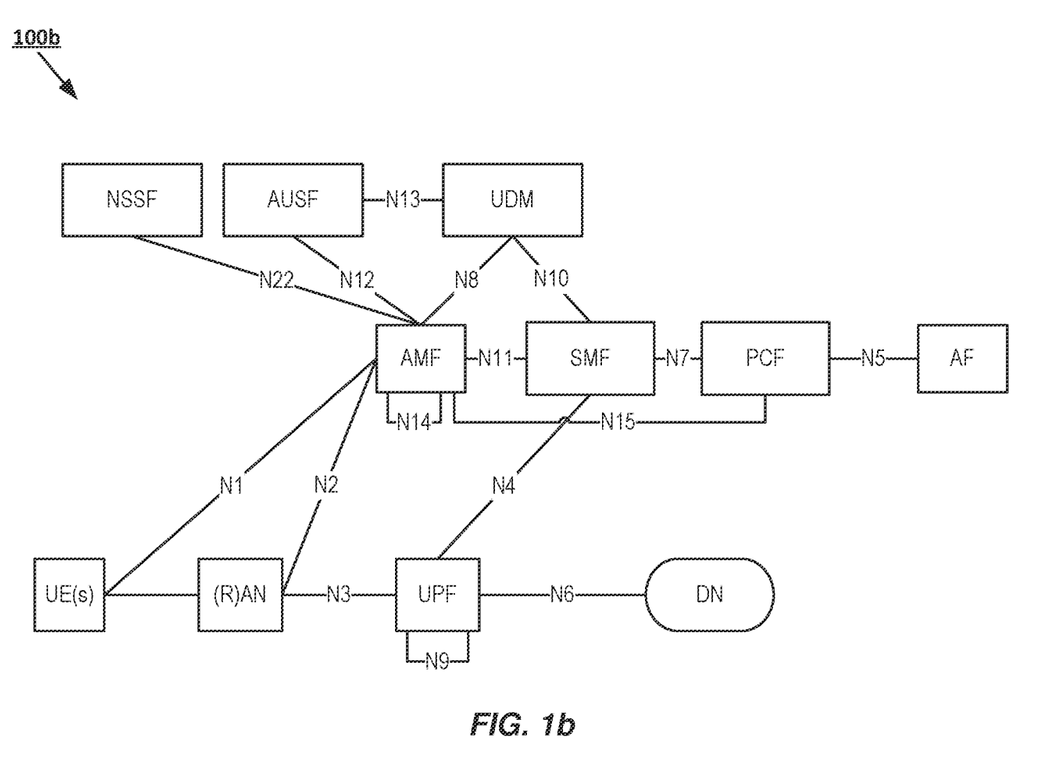
FIG. 1b depicts a reference 5G System architecture in the non-roaming case in which some embodiments of the present solution may be implemented.

FIG. 1a depicts a non-roaming reference 5G system architecture. Service-based interfaces are used within the Control Plane. FIG. 1b depicts a reference 5G System architecture in the non-roaming case, using the reference point representation showing how various network functions interact with each other.

Further background can e.g. be found in 3GPP TS 23.502-V15.4.1, clause 4.3.2 that describes a Protocol Data Unit (PDU) Session Establishment procedure. More particularly, 3GPP TS 23.502-V15.4.1, clause 4.2.3.2 describes a User Equipment device (UE) Triggered Service Request Procedure.

SUMMARY

The third generation partnership project (3GPP) SA2 group agreed in S2-1901089 (http://3gpp.org/ftp/tsg_sa/WG2_Arch/TSGS 2_130_Kochi/Docs/S2-1901089.zip) that the Downlink Non-Access Stratum Transport (DL NAS TRANSPORT) carrying the Protocol Data Unit Session Establishment Accept (PDU SESSION ESTABLISHMENT ACCEPT) is not sent by the 5th generation (5G) Radio Access Network (RAN) to the user equipment (UE) if the 5G RAN unable to allocate radio resources needed for the PDU session.

If the DL NAS TRANSPORT carrying the PDU SESSION ESTABLISHMENT ACCEPT is not sent to the UE:
according to TS 24.501 (http://www.3gpp.org/ftp/specs/archive/24_series/24.501/24501-f21.zip) subclause 6.4.1.6 bullet a), upon expiry of timer T3580, the UE will retransmit PDU SESSION ESTABLISHMENT REQUEST and transport it using an UL NAS TRANSPORT to the Access and Mobiliy function (AMF) also referred to herein as a management network node); and
according to TS 24.501 (http://www.3gpp.org/ftp/specs/archive/24_series/24.501/24501-f21.zip) subclause 5.4.5.2.5 bullet a) 12), upon reception of the UL NAS TRANSPORT with the retransmitted PDU SESSION ESTABLISHMENT REQUEST from the UE, the AMF performs local release of the existing PDU session, requests the Session Management Function (SMF) to perform local release of the existing PDU session, the AMF performs a new SMF selection and forwards the retransmitted PDU SESSION ESTABLISHMENT REQUEST to a new SMF.

Furthermore, if the new SMF accepts to setup the PDU session with resources which the 5G RAN is again unable to allocate and the 5G access network does not send the DL NAS TRANSPORT carrying the PDU SESSION ESTABLISHMENT ACCEPT to the UE again, the above will repeat 5 times.

So, if the 5G access network does not send DL NAS TRANSPORT carrying PDU SESSION ESTABLISHMENT ACCEPT to the UE, this generates unnecessary 5GSM messages (up to 5 retransmissions of PDU SESSION ESTABLISHMENT REQUEST) sent over the radio and unnecesary network actions (the AMF selecting a SMF, the SMF attempting to establish a PDU session, the AMF and the SMF locally releasing the PDU session, all done up to 5 times)

According to some embodiments of inventive concepts, methods may be provided to operate a session management network node in a radio access network. In such methods, the session management network node may accept a session establishment request of a wireless device. The acceptance may include establishing a session. The session management network node may receive a message from a management network node. The message may include a session connectivity rejection message from a radio access network node. The session connectivity rejection message may include a rejection by the radio access network of the acceptance of the session establishment request of the wireless device and a cause for the rejection by the radio access network. The session management network node may release the session; may determine that the radio access network omitted to transmit the acceptance of the session establishment request to the wireless device based on the cause for the rejection provided by the radio access network;
may create a session establishment rejection message; and
may transmit the session establishment rejection message toward the wireless device.

According to some embodiments of inventive concepts, methods may be provided to operate a radio access network node in a radio access network. In such methods, the radio access network node may transmit a session connectivity rejection message to a management network node. The session connectivity rejection message may include a cause for a rejection by the radio access network of a session establishment request of a wireless device. The radio access network node may receive a request message from the management network node. The request message may include a request that radio access network node forward to` the wireless device a session establishment rejection message received from a session network node. The radio access network node may transmit a rejection message to the wireless device. The rejection message may include the session establishment rejection message.

According to some embodiments, the session network node may send the session establishment rejection message and may determine that the message carrying the session management network node's session establishment acceptance was not sent to the wireless device by the radio access network and, thus, avoids unnecessary message exchanges.

One advantageous embodiment is directed to a method of operating a session management network node of a telecommunications network, the method performed by the session management network node comprising: sending to a management network node an accept of a session establishment request of a wireless device; receiving a message from the management network node, wherein the message includes a session connectivity rejection message sent by a radio access network node serving the wireless device, where the session connectivity rejection message indicates a rejection of the acceptance of the session establishment request of the wireless device; determining that the radio access network did not send the accept of the session establishment request to the wireless device based on the session connectivity rejection message provided by the radio access network; responsive to that the radio access network did not send the acceptance of the session establishment request to the wireless device, creating a session establishment rejection message; transmitting the session establishment rejection message toward the wireless device; and preferably releasing the session.

One other advantageous embodiment is directed to a method of operating a radio access network, RAN, node of a telecommunications network, the method performed by the RAN node comprises: transmitting a session connectivity rejection message to a management network node, wherein the session connectivity rejection message includes a cause for a rejection by the radio access network of a session establishment request of a wireless device; receiving a request message from the management network node, wherein the request message includes a request that radio access network node forward to the wireless device a session establishment rejection message transmitted by a session network node; transmitting a rejection message to the wireless device, wherein the rejection message includes the session establishment rejection message.

Presently disclosed embodiments may operate to avoid unnecessary messages (e.g., in 5GSM, up to 5 retransmissions of PDU SESSION ESTABLISHMENT REQUEST) sent over the radio and unnecesary network actions (e.g., the AMF selecting an SMF, the SMF attempting to establish a PDU session, the AMF and the SMF locally releasing the PDU session, all done up to 5 times). When the SMF sends PDU SESSION ESTABLISHMENT ACCEPT and the SMF may determine that the NAS message carrying the PDU SESSION ESTABLISHMENT ACCEPT was not sent to the UE by the 5G access network, then the SMF may prevent useless message exchanges (e.g., the repetitive, useless 5GSM message exchanges discussed above).

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

If the 5G access network does not send DL NAS TRANSPORT carrying PDU SESSION ESTABLISHMENT ACCEPT to the UE, in various embodiments, when the SMF sends PDU SESSION ESTABLISHMENT ACCEPT and the SMF may determine that the NAS message carrying the PDU SESSION ESTABLISHMENT ACCEPT was not sent to the UE by the 5G access network, then the SMF may send PDU SESSION ESTABLISHMENT REJECT.

According to some embodiments of inventive concepts, signalling/messages may be provided in a 5th generation system (5GS) radio access network.

In some embodiments of inventive concepts, the SMF may determine that the NAS message carrying the PDU SESSION ESTABLISHMENT ACCEPT was not sent to the UE by the 5G access network based on a cause provided by a 5G access network.

Figure 1C:
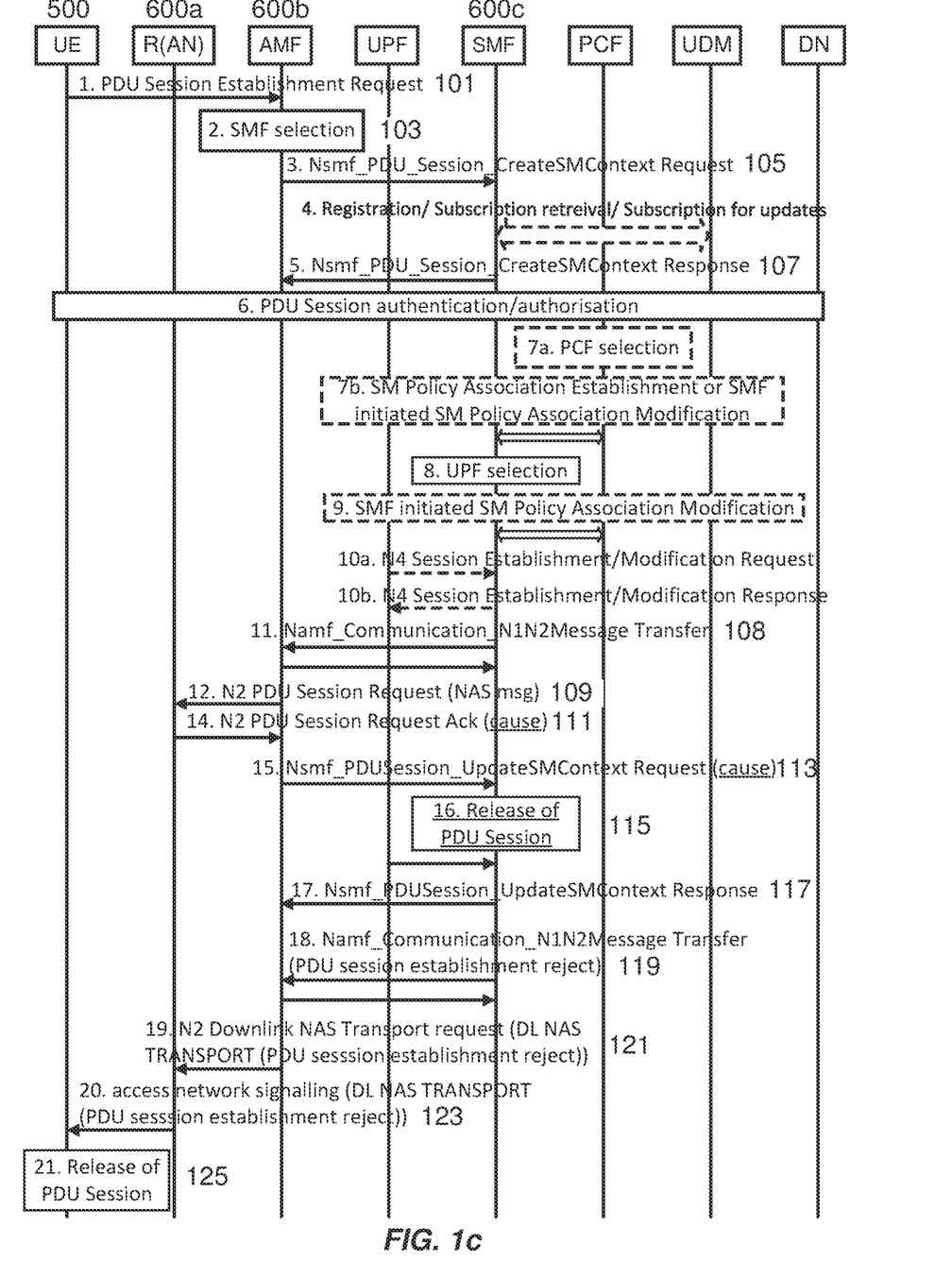
FIG. 1c is a message diagram illustrating communication of messages in accordance with some embodiments of the present disclosure.

FIG. 1c is a is a message diagram illustrating communication of messages/signals in accordance with some embodiments of the present disclosure. Referring to FIG. 1c:

At 101, a UE (e.g., wireless device 500) may transmit a PDU Session Establishment Request (also referred to below as a PDU Session Request) to a management network node (e.g., AMF network node 600b).

At 103, management network node 600b may determine that the message corresponds to a request for a new PDU Session and select a session management network node (e.g., SMF network node 600c).

At 105, the AMF network node 600b may transmit a PDU Session Create Session Management (SM) Context Request to the selected SMF network node 600c.

At 107 or 108, SMF network node 600c may transmit to AMF network node 600b a message carrying the SMF network node 600c's response to the request to create a PDU session, preferably by transmitting a PDU Session Establishment Accept message intended for the wireless device, preferably in a Namf_Connnnunication_N1N2MessageTransfer message or in a Nsmf_PDUSession_CreateSMContext Response message. The message may include accepting the PDU Session request or rejecting the PDU Session request. If the message includes an acceptance of the PDU Session request, the SMF network node 600c also may include a NAS information (e.g. N2 SM information). If the PDU Session request is accepted, the SMF network node 600c may establish a PDU Session.

At 109, if SMF network node 600c accepted the PDU Session request, AMF network node 600b may transmit to a radio access network node (e.g., (R)AN network node 600a) a session request message (e.g., a N2 PDU Session Request to RAN network node 600a). The message may include the NAS information (e.g. N2 SM information) received from SMF network node, including whether SMF network node 600c accepted the PDU Session Request.

At 111, (R)AN network node 600a may transmit to AMF network node 600b a session connectivity rejection message, e.g., a N2 PDU Session Request Acknowledgement (Ack)) when (R)AN network node 600a rejects the PDU Session Request. The session connectivity rejection message also may include the NAS information received from SMF network node 600c (e.g., the N2 SM information) and a cause for the rejection. The rejection may occur when SMF network node 600c accepted the PDU Session Request with resources that the radio access network is unable to allocate. The cause for the rejection may include insufficient resources, insufficient resources for a specific slice and DNN, or insufficient resources for a specific slice.

At 113, AMF network node 600b may forward the session connectivity rejection message from RAN network node 600a to SMF network node 600c in, e.g., a Nsmf_PDUSession_UpdateSMContext Response. The session connectivity rejection message may include the cause for (R)AN network node 600a's rejection of the PDU Session Request.

At 115, when the (R)AN network node 600a rejected the PDU Session request, the SMF may release the PDU session established by SMF network node 600c.

At 117, when SMF network node 600c releases the PDU Session, SMF network node 600c may transmit a message, e.g., a Nsmf_PDUSession_UpdateSMContext Response), to AMF network node 600b updating the AMF network node 600b.

At 119, SMF network node 600c may determine based on the content of the session connectivity rejection message that the message carrying the SMF network node 600c's response accepting the request to create a PDU session was not sent to UE 500 by (R)AN network node 600a, e.g. the determining may be based on the cause or similar provided by (R)AN network node 600a for (R)AN network node 600a's rejection of the PDU Session Request.

SMF network node 600c may create a PDU SESSION ESTABLISHMENT REJECT message). The PDU SESSION ESTABLISHMENT REJECT message may include an information element containing the cause for the radio access network's (e.g., 5GSM cause) rejection of the PDU Session request, e.g. indicating insufficient resources, insufficient resources for a specific slice and DNN, and insufficient resources for a specific slice. The information element may include a value set by SMF network node 600c for the cause of (R)AN network node 600a's rejection of the PDU Session Request. The value set may include a value indicating insufficient resources, insufficient resources for a specific slice and DNN, or insufficient resources for a specific slice. The value may include at least one of a character, a number, and a string of characters and numbers. For example, the value may be #26 for insufficient resources, #69 for "insufficient resources for specific slice" or #67 for "insufficient resources for specific slice and DNN".

SMF network node 600c may transmit the PDU SESSION ESTABLISHMENT REJECT message to AMF network node 600b in, e.g., a Namf_Connnnunication_N1N2MessageTransfer to AMF network node 600b, to be sent to UE 500. AMF network node 600b may respond to SMF network node 600c with, e.g., a Namf_Connmunication_N1N2MessageTransfer.

At 121, AMF network node 600b may transmit a seventh message (e.g., a N2 Downlink NAS Transport request) to (R)AN network node 600a, which may include the PDU SESSION ESTABLISHMENT REJECT received from SMF network node 600c to be sent to UE 500.

At 123, RAN network node 600a may transmit a downlink NAS Transport message to UE 500 which may include forwarding the PDU SESSION ESTABLISHMENT REJECT from SMF network node 600c.

At 125, responsive to receipt of the downlink NAS transport message from (R)AN network node 600a, UE 500 may release the PDU Session.

The PDU SESSION ESTABLISHMENT REJECT message may be sent using N2 Downlink NAS Transport procedure (as in TS 38.413 (http://www.3gpp.org/ftp/specs/archive/38_series/38.413/38413-f20.zip) subclause 8.6.2) rather than the N2 PDU Session Resource Setup (as in TS 38.413 (http://www.3gpp.org/ftp/specs/archive/38_series/38.413/38413-f20.zip) subclause 8.2.1). Usage of N2 Downlink NAS Transport procedure may ensure delivery of the DL 5GSM message to the UE as no additional resources being established.

Operations of radio access network nodes 600a, 600b, and 600c will now be discussed with reference to the flow charts of FIGS. 2-4 according to some embodiments of inventive concepts. For example, modules may be stored in memory 620 of FIG. 6, and these modules may provide instructions so that when the instructions of a module are executed by a respective radio access network node processor 610, processor 610 performs respective operations of the respective flow chart.

Figure 2:
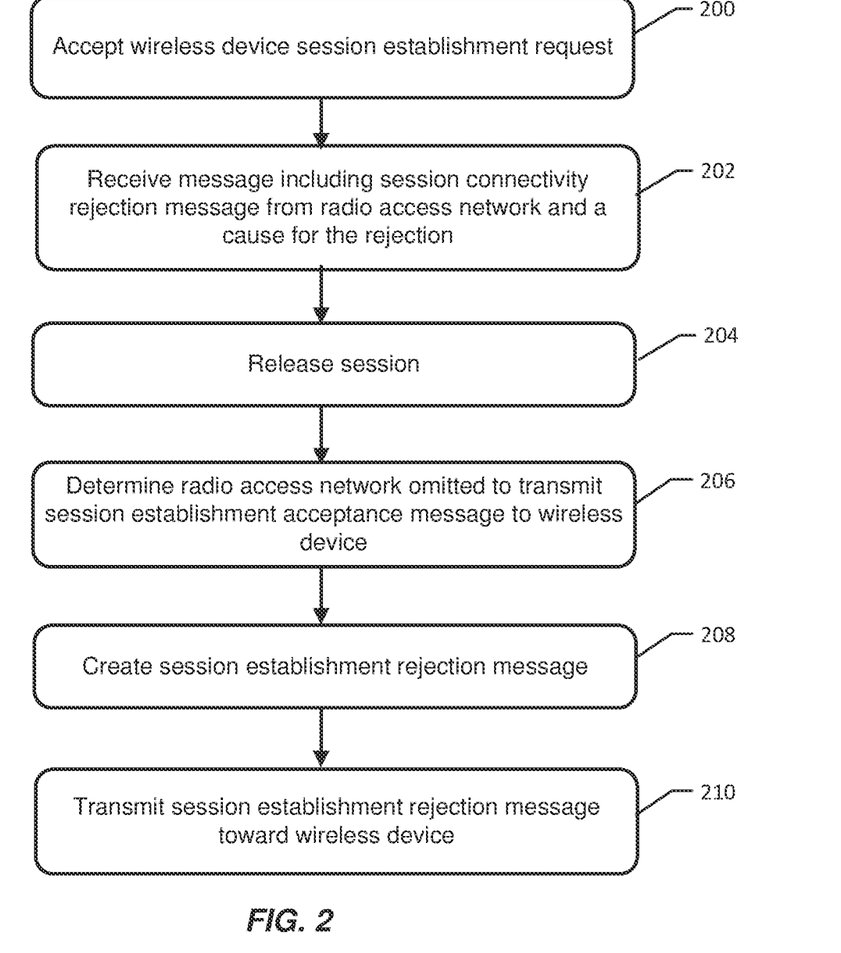
FIGS. 2-4 are flow charts illustrating radio access node operations according to some embodiments of inventive concepts.
Figure 3:
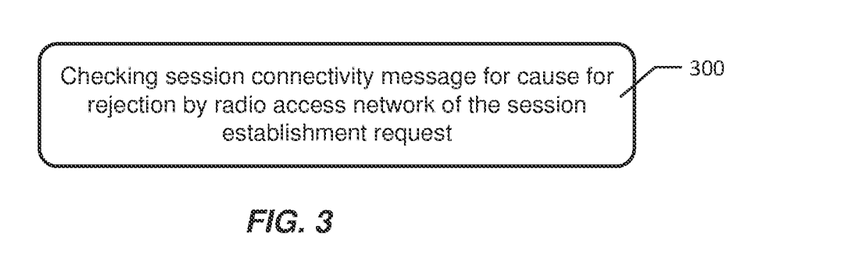

FIGS. 2 and 3 illustrate operations of a telecommunications network network node 600c. FIG. 4 illustrates operations of a radio access network (R)AN network node 600a. Each of the session network node 600c and the radio access network node 600a of FIGS. 2-4 may be provided according to the structure illustrated in FIG. 6.

Referring first to FIG. 2, at block 200, processor 610 of session management network node 600c (e.g. a SMF network node) may accept a session establishment request of a wireless device 500, preferably by sending a PDU Session Establishment Accept message intended for the wireless device, preferably in a Namf_Connnnunication_N1N2MessageTransfer message or in a Nsmf_PDUSession_CreateSMContext Response message. The session may be a protocol data unit (PDU) session.

At block 202, processor 610 of session management network node 600c may receive a message from management node 600b that includes a session connectivity rejection message from the (R)AN network node 600a. The session connectivity rejection message may include a rejection by the radio access network of the acceptance of the session establishment request of the wireless device and possibly a cause for the rejection by the radio access network. The cause, when provided by the radio access network, may include at least one of: insufficient resources, insufficient resources for a specific slice and DNN, and insufficient resources for a specific slice.

At block 204, processor 610 of session management network node 600c may release the session that it established responsive to accepting the session establishment request of a wireless device 500.

At block 206, processor 610 of session management network node 600c may determine that the radio access network did not send the session management network node 600c's acceptance of the session establishment request of wireless device 500. The session management network node 600c may make the determination based on the content of the session connectivity rejection message, e.g. based on the cause or similar for the rejection provided by the radio access network in the session connectivity rejection message provided to session management network node 600c disclosed in block 202.

At block 208, processor 610 of session management network node 600c may, responsive to that the radio access network did not send the acceptance of the session establishment request to the wireless device, create a session establishment rejection message. The session establishment rejection message may include a value set for the cause for the session establishment rejection, e.g. indicating insufficient resources, insufficient resources for a specific slice and DNN, or insufficient resources for a specific slice. The value may include at least one of a character, a number, and a string of characters and numbers. For example, the value may be #26 for insufficient resources, #69 for "insufficient resources for specific slice" or #67 for "insufficient resources for specific slice and DNN".

At block 210, processor 610 of session management network node 600c may transmit the session establishment rejection message toward the wireless device.

Referring to FIG. 3, at block 300, processor 610 of session management network node 600c may determine that the radio access network did not send the session management network node 600c's acceptance of the session establishment request of wireless device 500 by checking the session connectivity message for the cause of the radio access network's rejection of session management network node 600c's acceptance of the session establishment request.

Figure 4:
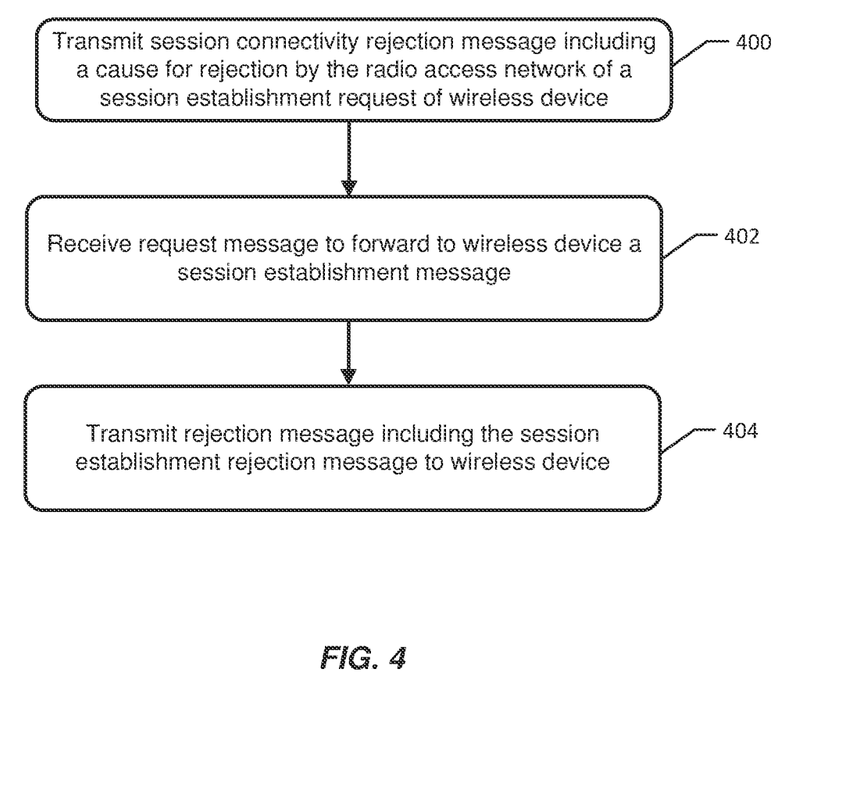

Referring to FIG. 4, at block 400, processor 610 of (R)AN network node 600c may transmit a session connectivity rejection message to management network node 600b. The session connectivity rejection message may include a cause for the rejection by the radio access network of a session establishment request of a wireless device (e.g., a PDU Session Request). The cause may include at least one of: insufficient resources, insufficient resources for a specific slice and DNN, and insufficient resources for a specific slice.

At block 402, processor 610 of (R)AN network node 600c may receive a request message from management network node 600b. The request message may include a request that (R)AN network node 600c forward to wireless device 500 a session establishment rejection message received at management network node 600b from session network node 600c. The session establishment rejection message being forwarded from session network node 600c, e.g., a PDU SESSION ESTABLISHMENT REJECT message, may include an information element containing the cause for the radio access network's (e.g., 5GSM cause) rejection of the PDU Session request. The information element may include a value set by SMF network node 600c for the cause of (R)AN network node 600a's rejection of the PDU Session Request. The value set may include a value indicating insufficient resources, insufficient resources for a specific slice and DNN, or insufficient resources for a specific slice. The value may include at least one of a character, a number, and a string of characters and numbers. For example, the value may be #26 for "insufficient resources", #69 for "insufficient resources for specific slice" or #67 for "insufficient resources for specific slice and DNN". The request message may be a N2 downlink NAS Transport request message.

At block 404, processor 610 of (R)AN network node 600c may transmit a rejection message to wireless device 500. The rejection message may include the session establishment rejection message. The rejection message may be a downlink NAS transport message.

Figure 5:
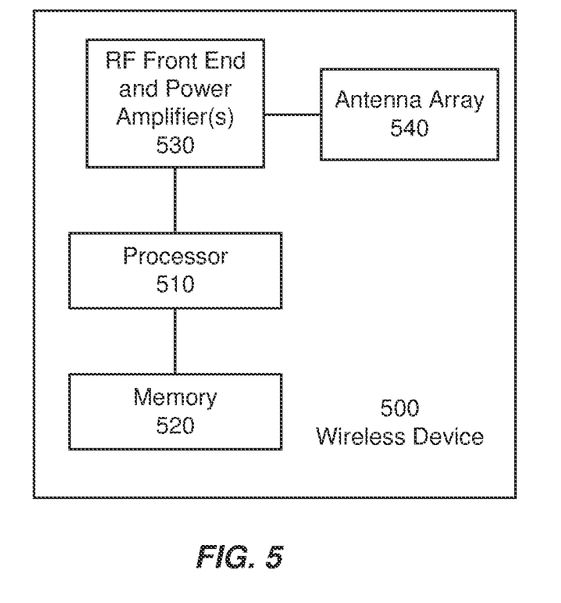
FIG. 5 is a block diagram of a wireless device according to some embodiments of inventive concepts.

FIG. 5 is a block diagram illustrating a wireless device 500 that is configured according to some embodiments. The wireless device 500 can include, without limitation, a wireless terminal, a wireless communication device, a wireless communication terminal, a terminal node/UE/device, etc. The wireless device 500 includes a RF front-end 530 comprising one or more power amplifiers the transmit and receive through antennas of an antenna array 540 to provide uplink and downlink radio communications with a radio network node (e.g., a base station, eNB, gNB, a (R)AN network node, a management network node, etc.) of a telecommunications network. Instead of or in addition to the RF front-end 530, the wireless device 500 may include a light reception front-end configured to receive light signaling such from a Light WiFi AP. Wireless device 500 further includes a processor circuit 510 (also referred to as a processor) coupled to the RF front end 530 and a memory circuit 520 (also referred to as memory). The memory 520 stores computer readable program code that when executed by the processor 510 causes the processor 510 to perform operations according to embodiments disclosed herein.

Figure 6:
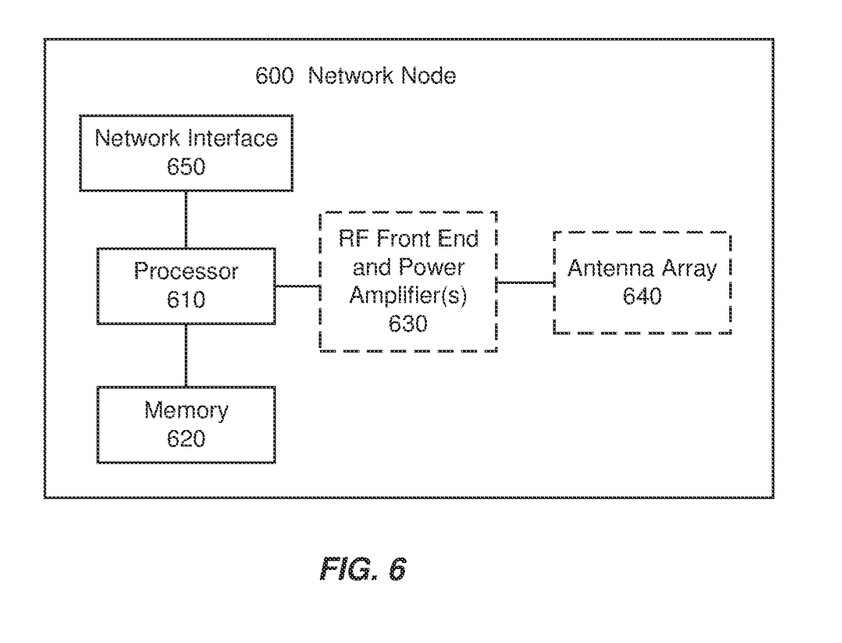
FIG. 6 is a block diagram of a network node according to some embodiments of inventive concepts.

FIG. 6 is a block diagram illustrating a network node 600 (e.g., a base station, eNB, gNB, a (R)AN network node, and more preferably an AMF network node (also referred to herein as a management network node), SMF network node (also referred to herein as a session network node), etc.) of a telecommunications network. The network node 600 includes a processor circuit 610 (also referred to as a processor), a memory circuit 620 (also referred to as memory), and a network interface 650 (e.g., wired network interface and/or wireless network interface) configured to communicate with other network nodes. The network node 600 may be configured as a radio network node containing a RF front-end and/or a light signaling front-end with one or more power amplifiers 630 that transmit and receive through antennas of an antenna array 640. The memory 620 stores computer readable program code that when executed by the processor 610 causes the processor 610 to perform operations according to embodiments disclosed herein. As is readily understood by a person skilled in the art that reads this disclosure, the network node 600 may e.g. be implemented as a network element on a dedicated hardware or as a software instance running on a dedicated hardware, or as a virtualized function instantiated on an appropriate platform, e.g., a cloud infrastructure.

Some of the embodiments that have been described above may be summarized in the following manner:

1. A method of operating a session management network node (600c, 900) of a telecommunications network (100a, 100b), the method performed by the session management network node comprising:
    sending to a management network node (600b) an accept (107, 108, 200) of a session establishment request of a wireless device;
    receiving (113, 202) a message from the management network node, wherein the message includes a session connectivity rejection message sent by a radio access network node (600a) serving the wireless device, where the session connectivity rejection message indicates a rejection of the acceptance of the session establishment request of the wireless device;
    determining (119, 206) that the radio access network omitted to transmit the accept of the session establishment request to the wireless device based on the session connectivity rejection message provided by the radio access network;
    responsive to the radio access network omitting to transmit the acceptance of the session establishment request to the wireless device, creating (119, 208) a session establishment rejection message;
    transmitting (119, 210) the session establishment rejection message toward the wireless device; and
    releasing (115, 204) the session, preferably at least in the session management network node.
2. The method of Embodiment 1, wherein the determining comprises:
    checking (113, 300) the session connectivity message for a cause of the rejection provided by the radio access network.
3. The method of Embodiment 2, wherein the cause provided by the radio access network includes at least one of: insufficient resources, insufficient resources for a specific slice and DNN, and insufficient resources for a specific slice.
4. The method of any of Embodiments 2 to 3, wherein creating the session establishment rejection message includes a value into the session establishment rejection message indicating the cause for the session establishment rejection.
5. The method of Embodiment 4, wherein the value includes at least one of a character, a number, and a string of characters and numbers.
6. The method of any of Embodiments 1 to 5, wherein the session is a protocol data unit session.
7. A method of operating a radio access network, RAN, node (600a) of a telecommunications network (100a, 100b), the method performed by the RAN node comprises:
    transmitting (111, 400) a session connectivity rejection message to a management network node (600b), wherein the session connectivity rejection message includes a cause for a rejection by the radio access network of a session establishment request of a wireless device;
    receiving (121, 402) a request message from the management network node, wherein the request message includes a request that radio access network node forward to the wireless device a session establishment rejection message transmitted by a session network node;
    transmitting (123, 404) a rejection message to the wireless device, wherein the rejection message includes the session establishment rejection message.
8. The method of Embodiment 7, wherein the cause includes at least one of: insufficient resources, insufficient resources for a specific slice and DNN, and insufficient resources for a specific slice.
9. The method of any of Embodiments 7 to 8, wherein the request message comprises an N2 downlink NAS Transport request message.
10. The method of any of Embodiments 7 to 9, wherein the rejection message comprises a downlink NAS transport message.
11. A session management network node (600c) of a telecommunications network (100a, 100b) comprising:
    a processor (610); and
    memory (620) coupled with processor (610), wherein the memory includes instructions that when executed by the processor (610) causes the session network node to perform operations according to any of Embodiments 1-6.
12. A radio access network node (600a) of a telecommunications network (100a, 100b) comprising:
    a processor (610); and
    memory (620) coupled with processor (610), wherein the memory includes instructions that when executed by the processor (610) causes the radio access network node to perform operations according to any of Embodiments 7-10.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied top any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method of operating a session management function (SMF) network node of a telecommunications network, the method performed by the SMF network node comprising:
   sending to an access and mobility management function (AMF) network node an acceptance of a session establishment request of a wireless device;
   receiving a message from the AMF network node, wherein the message includes a session connectivity rejection message sent by a radio access network node serving the wireless device, where the session connectivity rejection message indicates a rejection of the acceptance of the session establishment request of the wireless device;
   determining that the radio access network did not send the acceptance of the session establishment request to the wireless device based on the session connectivity rejection message provided by the radio access network;

responsive to that the radio access network did not send the acceptance of the session establishment request to the wireless device, creating a session establishment rejection message; and transmitting the session establishment rejection message toward the wireless device.

2. The method of claim 1, further comprising: releasing the session.

3. The method of claim 2, wherein creating the session establishment rejection message includes a value into the session establishment rejection message indicating the cause for the session establishment rejection.

4. The method of claim 3, wherein the value includes at least one of a character, a number, and a string of characters and numbers.

5. The method of claim 1, wherein the determining comprises:

checking the session connectivity rejection message for a cause of the rejection provided by the radio access network.

6. The method of claim 5, wherein the cause provided by the radio access network includes at least one of: insufficient resources, insufficient resources for a specific slice and data network name (DNN), and insufficient resources for a specific slice.

7. The method of claim 1, wherein the session is a protocol data unit session.

8. A method of operating a radio access network (RAN) node of a telecommunications network, the method performed by the RAN node comprises:

transmitting a session connectivity rejection message to an access and mobility management function (AMF) network node, wherein the session connectivity rejection message includes a cause for a rejection by the radio access network of a session establishment request of a wireless device;

receiving a request message from the AMF network node, wherein the request message includes a request that radio access network node forward to the wireless device a session establishment rejection message transmitted by a session management function (SMF) network node; and transmitting a rejection message to the wireless device, wherein the rejection message includes the session establishment rejection message.

9. The method of claim 8, wherein the cause includes at least one of: insufficient resources, insufficient resources for a specific slice and data network name (DNN), and insufficient resources for a specific slice.

10. The method of claim 8, wherein the request message comprises an N2 downlink Non-Access Stratum (NAS) Transport request message.

11. The method of claim 8, wherein the rejection message comprises a downlink Non-Access Stratum (NAS) transport message.

12. A session management function (SMF) network node of a telecommunications network comprising:

a processor; and memory coupled with processor, wherein the memory includes instructions that when executed by the processor causes the SMF network node to perform operations comprising:

sending to an access and mobility management function (AMF) network node an acceptance of a session establishment request of a wireless device;

receiving a message from the AMF network node, wherein the message includes a session connectivity rejection message sent by a radio access network node serving the wireless device, where the session connectivity rejection message indicates a rejection of the acceptance of the session establishment request of the wireless device;

determining that the radio access network did not send the acceptance of the session establishment request to the wireless device based on the session connectivity rejection message provided by the radio access network;

responsive to that the radio access network did not send the acceptance of the session establishment request to the wireless device, creating a session establishment rejection message; and transmitting the session establishment rejection message toward the wireless device.

13. The SMF network node of claim 12, further comprising: releasing the session.

14. The SMF network node of claim 12, wherein the determining comprises:

checking the session connectivity rejection message for a cause of the rejection provided by the radio access network.

15. The SMF network node of claim 14, wherein the cause provided by the radio access network includes at least one of: insufficient resources, insufficient resources for a specific slice and data network name (DNN), and insufficient resources for a specific slice.

16. The SMF network node of claim 12, wherein creating the session establishment rejection message includes a value into the session establishment rejection message indicating the cause for the session establishment rejection.

17. The SMF network node of claim 16, wherein the value includes at least one of a character, a number, and a string of characters and numbers.

18. The SMF network node of claim 12, wherein the session is a protocol data unit session.

19. A radio access network node of a telecommunications network comprising:

a processor; and memory coupled with processor, wherein the memory includes instructions that when executed by the processor causes the radio access network node to perform operations comprising:

transmitting a session connectivity rejection message to an access and mobility management function (AMF) network node, wherein the session connectivity rejection message includes a cause for a rejection by the radio access network of a session establishment request of a wireless device;

receiving a request message from the AMF network node, wherein the request message includes a request that radio access network node forward to the wireless device a session establishment rejection message transmitted by a session management function (SMF) network node; and transmitting a rejection message to the wireless device, wherein the rejection message includes the session establishment rejection message.

20. The radio access network node of claim 19, wherein the cause includes at least one of: insufficient resources, insufficient resources for a specific slice and data network name (DNN), and insufficient resources for a specific slice.

21. The radio access network node of claim 19, wherein the request message comprises an N2 downlink Non-Access Stratum (NAS) Transport request message.

22. The radio access network node of claim 19, wherein the rejection message comprises a downlink Non-Access Stratum (NAS) transport message.

\* \* \* \* \*

UNITED STATES PATENT AND TRADEMARK OFFICE
CERTIFICATE OF CORRECTION

PATENT NO. : 12,144,047 B2  
APPLICATION NO. : 17/430778  
DATED : November 12, 2024  
INVENTOR(S) : Sedlacek et al.

It is certified that error appears in the above-identified patent and that said Letters Patent is hereby corrected as shown below:

In the Specification

In Column 12, Line 44, delete "applied top" and insert -- applied to --, therefor.

Signed and Sealed this
Twenty-second Day of April, 2025

Coke Morgan Stewart
*Acting Director of the United States Patent and Trademark Office*